(12) United States Patent
Mitchell et al.

(10) Patent No.: US 7,568,192 B2
(45) Date of Patent: Jul. 28, 2009

(54) AUTOMATED SCALABLE AND ADAPTIVE SYSTEM FOR MEMORY ANALYSIS VIA IDENTIFICATION OF LEAK ROOT CANDIDATES

(75) Inventors: Nick M. Mitchell, White Plains, NY (US); Gary S. Sevitsky, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 10/673,837

(22) Filed: Sep. 29, 2003

(65) Prior Publication Data

US 2005/0071460 A1 Mar. 31, 2005

(51) Int. Cl.
G06F 9/44 (2006.01)
G06F 9/45 (2006.01)

(52) U.S. Cl. ............ 717/159; 717/127; 717/132; 717/133; 717/143; 717/144; 717/157

(58) Field of Classification Search ............ None
See application file for complete search history.

(56) References Cited

U.S. PATENT DOCUMENTS

| 6,286,016 | B1 | 9/2001 | Heller |
| 6,330,556 | B1 | 12/2001 | Chilimbi |
| 6,349,314 | B1 | 2/2002 | Patel |
| 6,370,684 | B1 | 4/2002 | De Pauw |
| 6,434,577 | B1 | 8/2002 | Garthwaite |
| 6,675,379 | B1 * | 1/2004 | Kolodner et al. ............ 717/155 |
| 6,799,191 | B2 * | 9/2004 | Agesen et al. ............ 707/206 |
| 2004/0073764 | A1 * | 4/2004 | Andreasson ............ 711/170 |

* cited by examiner

*Primary Examiner*—Chuck O Kendall
(74) *Attorney, Agent, or Firm*—Michael J. Buchenhorner; Douglas W. Cameron

(57) ABSTRACT

A method for identifying a set of objects in a target application program includes: receiving a plurality of samples of one or more object reference graphs, wherein each object reference graph includes live objects and their references; deriving a set of candidate data structures from the samples; collecting a plurality of properties of each of the live objects in relation to data structures over time; and using a mixture model, combining the plurality of the properties of each live object in a non-linear manner for ranking leak root candidates within each set of candidate data structures The method also includes the identification of an initial set of highly-ranked candidate objects that are possible causes of at least one object leak, wherein the higher the ranking the smaller the identified set.

11 Claims, 10 Drawing Sheets

PHASE 1 METRICS/BINARY

Structural
  $S_1$ leaf nodes
  $S_2$ arrays
  $S_3$ internal nodes
  $S_4$ non-owners Temporal
  $T_1$ no age intersection
  $T_2$ new arrays only
  $T_3$ no fringe
  $T_4$ no data type intersection

285

PHASE 2 METRICS/GATING
  $G_1$ on-stack ownership
  $G_2$ on-stack reachability
  $G_3$ ownership counts
  $G_4$ new ownership
  $G_5$ array ownership
  $G_6$ fringe ownership
  $G_7$ fringe data type uniformity
  $G_8$ data type intersection
  $G_9$ dominance frontier

280

REFERENCE GRAPH ATTRIBUTES

Single Entry Equivalence
Garbage Collection Roots
Reachability
Unique Ownership
Age
Size

290

PHASE 3 METRICS/FIXPOINT

$F_1$ immediate domination residue
$F_2$ by type immediate domination residue
$F_3$ immediate dominator residue

| | | | | | | |
|---|---|---|---|---|---|---|
| 10.554 | simpleleaker class obj... | Vector object | by type: Integer | 8100 | grower | grower |
| 3.28 | simpleleaker class obj... | Vector object | by type: Character | 151 | grower | grower |
| 1.379 | simpleleaker class obj... | LinkedList$Entry object | by type: LinkedList$Entry | 5 | grower | grower |
| 1.129 | simpleleaker class obj... | LinkedList$Entry object | by type: LinkedList$Entry | 4 | grower | grower |
| 0.587 | simpleleaker class obj... | Vector object | by type: Boolean | 900 | flatliner | flatliner |

Tracking grower in jinsight.leaky.AdditionTemplate@9a4f8e; size estimate=151.
Tracking flatliner in jinsight.leaky.AdditionTemplate@10cceb3; size estimate=900.
Decreasing arm rate of jinsight.leaky.AdditionTemplate@10cceb3 to 0.80999994

*FIG. 5*

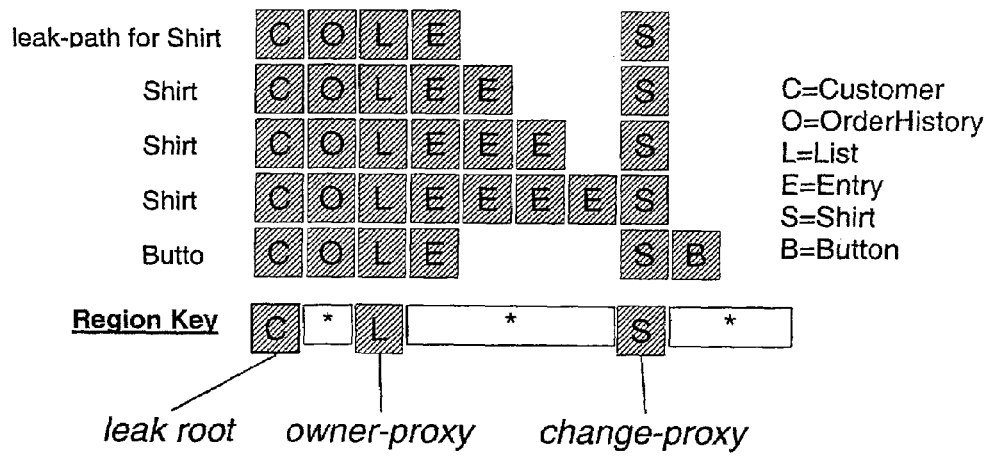

*FIG. 4*

AUTOMATED SCALABLE AND ADAPTIVE SYSTEM FOR MEMORY ANALYSIS VIA IDENTIFICATION OF LEAK ROOT CANDIDATES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable

FIELD OF THE INVENTION

The invention disclosed broadly relates to the field of information processing systems and more particularly relates to the field of automatic memory analysis.

BACKGROUND OF THE INVENTION

Memory analysis has become an important area of focus for information processing systems. Problems such as excessive memory footprint or unbounded memory growth over time are common causes of system slowdown and failure. For large-scale systems, understanding the behavior of a program's memory over time, and finding the root cause of memory problems can be difficult with currently available techniques. One area of particular concern is that of memory leaks. Despite automatic garbage collection, memory leaks remain a significant problem for many Java applications. A memory leak occurs when a Java program inadvertently maintains references to objects that are no longer needed, preventing the garbage collector (GC) from reclaiming space. Memory leaks are easy to spot, but are often difficult to diagnose. The likelihood that a memory leak exists can be determined by using black box analysis, monitoring the memory heap after each round of garbage collection. Each round of garbage collection frees less and less memory space until the application grinds to a halt for lack of space.

A number of diagnostic tools exist that help users determine the root cause of a leak. These tools rely on a combination of heap snapshot differencing, and allocation and/or usage tracking at a fine level of detail. However, these techniques are not adequate for large-scale, enterprise applications.

Many existing memory management tools work by dividing a program heap into old objects and newer objects, under the assumption that the older objects are more likely to be permanent. Referring to FIG. 1, there is shown an illustration of a set of objects 100 including older objects 102, recently created objects 104, and a boundary or fringe 106 between them. By classifying the objects, the user manually tries to discover why the newer, ostensibly more temporary objects are being retained, by exploring the boundary (or fringe) 106. We say an object is on the fringe if it is a new object pointed to by an older one. The objects 102 in the older side of the fringe 106 comprise old objects 108 and fringe-old objects 110. The objects 104 in the new side of the fringe 106 comprise new objects 112 and fringe-new objects 114. This classification scheme is used to analyze possible sources of memory leaks. This manual method of leak analysis is time-consuming and difficult to implement.

To diagnose a memory leak, a user must look for a set of candidate data structures that are likely to have problems. Finding the right data structures on which to focus is difficult. As we will discuss herein, when exploring the reference graphs (sets of currently live objects and their references) of large applications, issues of noise, complexity, and scale make this a daunting task. For example, e-Business servers intentionally retain a large number of objects in caches. Existing analysis approaches require that the user manually distinguish these cached objects from truly leaking ones. In general, these approaches swamp the user with too much low level detail about individual objects that were created, and leave the user with the difficult task of interpreting complex reference graphs or allocation paths in order to understand the larger context. This interpretation process requires a lot of expertise and it involves many hours of analysis to find the root cause of a leak. Moreover, these techniques will in some cases perturb the running application too much to be of practical value, especially in production environments, making them inadequate for leak detection in enterprise systems.

Many known applications have properties, common to many Java applications, that make memory leak diagnosis especially difficult. These applications make heavy use of reusable frameworks and libraries, often from many sources. These framework intensive applications contain large amounts of code where the inner workings are not well understood by the developers, let alone those doing the problem determination. Server-side e-Business applications make use of particularly large frameworks, and introduce additional analysis difficulties due to their high degree of concurrency, scale, and long-running nature.

Existing tools have been used to help diagnose leaks. For example, the HPROF (Java H Profiler) tool works by categorizing each object according to its allocation call path and type, as shown in Table 1 below. This table shows the output of HPROF on a simple example using an application which, in a loop, leaks objects of various datatypes. The tool, as the program runs, makes notes of every object allocation: it remembers the call stack of the allocation, and the allocated datatype; in this way, it assigns a pair (STACK, TYPE) to each allocated object. As the program runs, it records statistics of these tuples. For example, it records how many allocations map to each tuple, and how many allocated, but not yet freed map to a tuple. Then, when the program completes (or when the tool user requests), HPROF sorts the histogram by the "live" statistic, and prints out the current top-N. Table 1 shows the top-5 for our simple example.

TABLE 1

| | Percent | | Live | | Allocated | | Stack | Class |
|---|---|---|---|---|---|---|---|---|
| Rank | Self | Accum | Bytes | Objects | Bytes | Objects | Trace | Name |
| 1 | 97.31 | 97.31 | 1028000 | 10000 | 10280000 | 10000 | 1995 | Byte array |
| 2 | 97.31 | 97.31 | 40964 | 1 | 81880 | 10 | 1996 | Object array |
| 3 | 97.31 | 97.31 | 40000 | 10000 | 40000 | 10000 | 1994 | MemoryConsumer |
| 4 | 97.31 | 97.31 | 16388 | 1 | 16388 | 1 | 1295 | Character array |
| 5 | 97.31 | 97.31 | 16388 | 1 | 16388 | 1 | 1304 | Character array |

Some recent work uses static semantics to enforce and detect ownership using ownership types. Data structures are composed of the objects they own. Thus, to diagnose a leak, one must find the data structures which own leaking objects. D. Clarke, J. Noble, and J. Potter, "Simple Ownership Types for Object Containment," European Conference on Object Oriented Programming, 2001. Some have studied the interaction between the application's and the runtime's use of objects. See N. Rojemo and C. Runciman. "Lag, drag, void and use—heap profiling and space-efficient compilation revisited. In International Conference on Functional Programming, pages 34-41, 1996." They break an object's lifetime into several phases, such as the time after allocation and before first use, and the time between last use and collection ("drag"). See *The Glasgow Haskell Compiler User's Guide.* http://haskell.cs.yale,edu/ghc. as of version 5.03 has built-in support for this type of analysis, which it calls "biographical profiling." Other works study how liveness information [see O. Agesen, D. Detlefs, and J. E. B. Moss, *Garbage Collection And Local Variable Type Precision And Liveness In Java Virtual Machines*, Programming Language Design and Implementation, 1998] or reachability [M. Hirzel, J. Hinkel, A. Diwan, and M. Hind, *Understanding The Connectivity Of Heap Objects*, International Symposium on Memory Management, 2002] can benefit conservative garbage collection. We next discuss three problems encountered in analyzing data structures: perturbation, noise, and data structure complexity.

Perturbation

A tool perturbs the running of an application by making it run at a different speed than it otherwise would or by causing it to interact with the runtime in a different way (e.g. allocate objects that it wouldn't have normally, or trigger garbage collections at a different frequency). In tracking the call stack of every allocation, the tool HPROF causes perturbance by reducing the throughput of a web-based application by five to ten times. Heap differencing tools that acquire full heap snapshots late into a leak can cause a system with a large heap size to pause for tens of seconds. For servers these slowdowns or pauses can cause timeouts, significantly changing the behavior of the application. On production servers, this level of service degradation is completely out of the question.

Noise

Given a persisting object, it is difficult to determine whether it has a legitimate reason for persisting. For example, caches and resource pools intentionally retain objects for long periods of time, even though the objects may no longer be needed. This is especially relevant to e-Business applications, where numerous resource management mechanisms (such as database connection pools and web page fragment caches) are used behind the scenes to ensure good transaction performance. Some other common examples of noise are: session information that is retained for a fixed time period in web-based systems, in case the user returns later; containers that have "lazy" removal policies; objects that appear to persist only because they are part of a transaction that was in progress when the application's state was captured. Noise can be especially problematic when diagnosing slow leaks in long-running systems; noise effects can dwarf the evidence needed to diagnose a slow leak until very late in the run.

Data Structure Complexity

Knowing the type of leaking object that predominates, often a low level type such as String, does not help explain why the leak occurs. This is because these Strings are likely to be used in many contexts, and even may be used for multiple purposes within the same high level data structure, such as a DOM (Document Object Model) document. In addition, presented with the context of low level leaking objects, it is easy to get lost quickly in extracting a reason for leakage. For example, a single DOM object contains many thousands of objects, with a rich network of references among them. Without knowledge of the implementation of frameworks, it is difficult to know which paths in the reference graph to follow, or, when analyzing allocation call paths, which call site is important.

Existing techniques provide little assistance in this area. An aggregate view, dividing the heap into old, new, and fringe objects, provides little insight for determining which objects exist due to the flux in and out of caches, which are from a transaction in progress, and which are leaks. Existing approaches leave the user with the difficult work of searching through reference graphs or call stacks manually, as shown in Table 1. Users must rely on their own, often limited knowledge of how the application and frameworks manage their data, in order to segregate objects by their likely usage. Therefore, there is a need for a system that overcomes the drawbacks discussed above.

SUMMARY OF THE INVENTION

Briefly, according to a claimed invention, a method for identifying a set of objects in a target application includes the steps of: a) receiving a plurality of samples of one or more object reference graphs wherein each object reference graph includes live objects from the target application and their references; b) deriving a set of candidate data structures exhibiting a problematic data structure evolution from the samples; c) collecting a plurality of properties of each of the live objects in each of the candidate data structures in relation to data structures over time; and d) using a mixture model, combining the plurality of the properties of each live object, in a non-linear fashion for ranking leak root candidates within each set of candidate data structures.

Using the mixture model includes steps of: applying binary metrics to each of the candidate data structures for geherating a set of potential leak root candidates; assigning a binary metric value to each candidate, wherein a value of zero indicates that the candidate data structure is definitely not a leak root candidate and wherein a value of one indicates that the candidate data structure is a highly probable leak root candidate; and filtering out candidate data structures with any binary metric assigned a value of zero.

BRIEF DESCRIPTION OF THE DRAWINGS

FIG. 2C is a block diagram listing the metrics applied in each of the three ranking phases.

FIG. 4 is a diagram showing some leak paths from FIG. 3B.

FIG. 5 shows a screen display of a tool for identifying possible leaks.

DETAILED DESCRIPTION

According to an embodiment of the invention the difficulties discussed above are overcome by raising the level of analysis from individual objects to regions within data structures. Data structures are subgraphs of an object reference graph snapshot, where the nodes of the subgraph are identified as the owners of the remaining constituents. This approach has two beneficial consequences. First, it enables automated discovery and simple presentations of what is really causing problematic data structure evolution (such as a memory leak or leaks). Second, it enables lightweight and automated tracking of how whole data structures evolve. To realize these benefits, these new methods are utilized: 1) ranking data structures automatically by their likelihood of containing leaks; 2) identifying suspicious regions within a data structure; 3) characterizing their expected evolution, and 4) a lightweight system to track those regions' actual evolution as the program runs.

Figure 1:
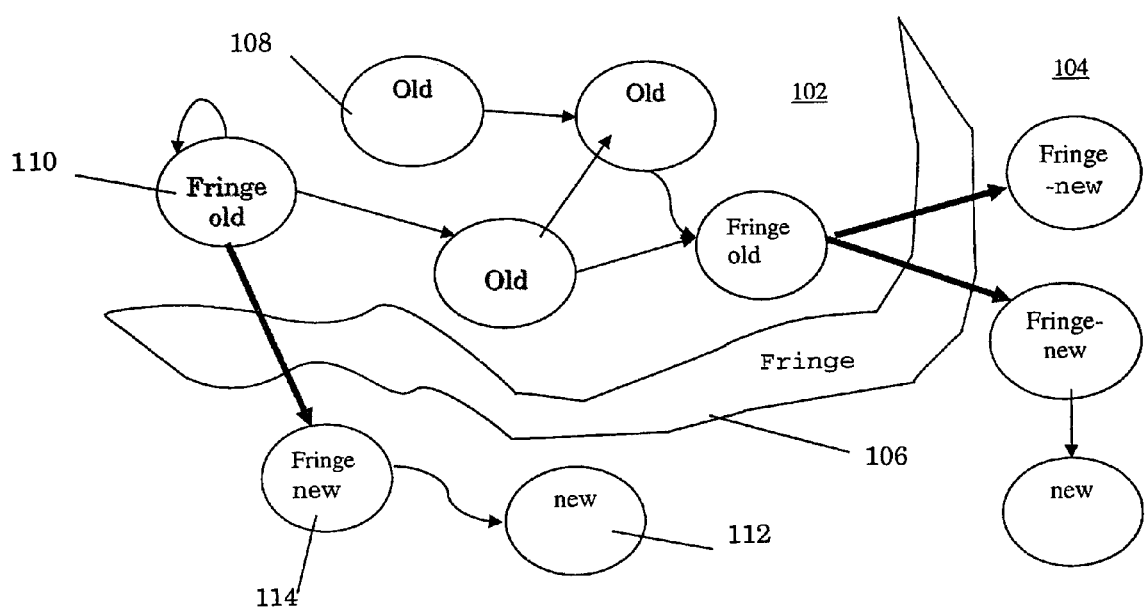
FIG. 1 is an illustration of a set of objects including older objects, recently created objects and a boundary or fringe between them, according to the known art.
Figure 2:
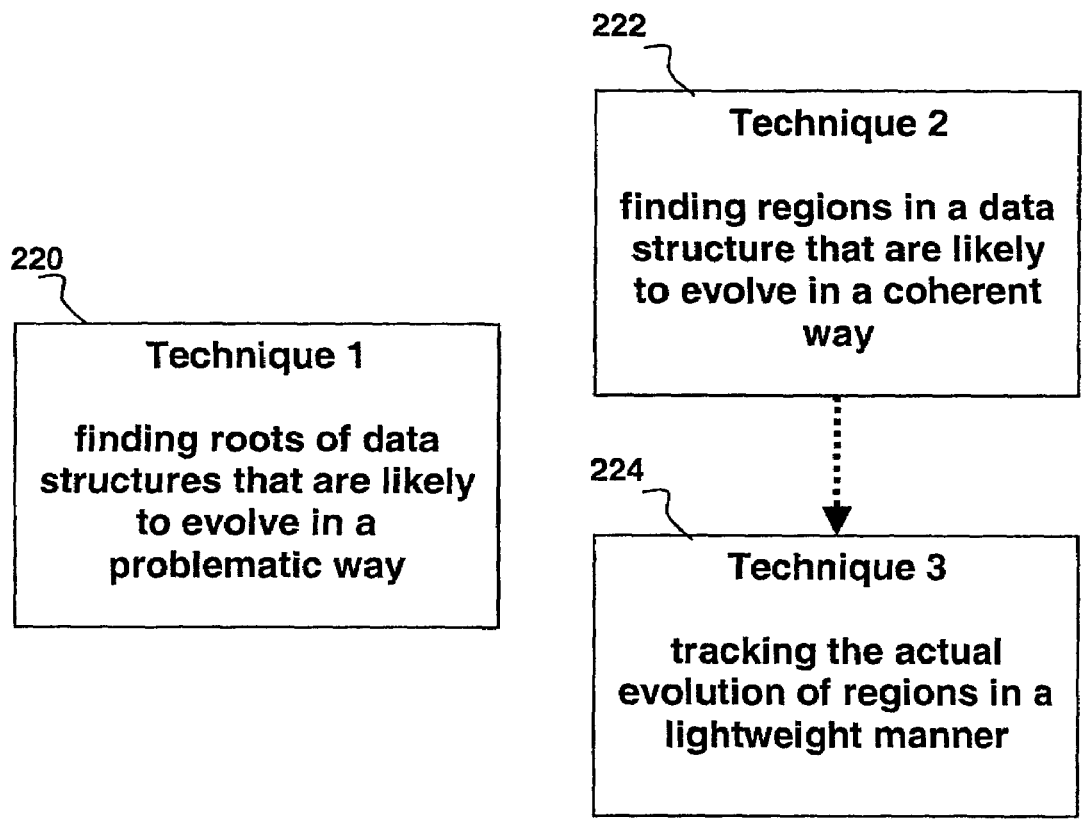
FIG. 2 is a simplified diagram of the techniques implemented according to the invention.

FIG. 2 introduces three techniques (or phases) for diagnosing problematic data structure evolution. We focus our examples on memory leaks although these techniques, whether used separately or jointly, can be successfully implemented as diagnostic tools on a broad range of problems. The first technique 220 focuses on finding the roots of data structures which are likely to evolve in a problematic way (e.g., leak). The second technique 222 focuses on finding regions within a data structure that are likely to evolve in a coherent way. This technique can be performed directly after the completion of the first technique or it can be performed as a stand-alone process if provided different input. Lastly, the third technique 224 tracks the actual evolution of regions in a lightweight manner so as not to perturb a running system. This third technique 224 requires input from the second technique 222. The third technique 224 can benefit from the output of the first technique 220. These three techniques will be discussed below. Although it is to be understood that the techniques to be discussed can be implemented for use in a broad range of applications, we discuss embodiments of these techniques in an automated and lightweight memory leak detection tool. In a system according to the invention, these techniques can work on large scale Java applications. Furthermore, the techniques, although individually useful, are especially powerful when used in combination.

TABLE 2

(a)

| Class Name | Old | New |
|---|---|---|
| java.lang.ref.Finalizer | 20246 | 17084 |
| java.lang.String | 223266 | 9453 |
| xerces . . . TextImpl | 9035 | 7676 |
| character array | 202782 | 5290 |
| xerces . . . AttrImpl | 6258 | 5135 |
| object array | 17165 | 3255 |
| java.util.Hashtable$Entry | 56745 | 3244 |
| xerces . . . NamedNodeMapImpl | 3667 | 2713 |
| xerces . . . ElementImpl | 3204 | 2123 |
| integer array | 4410 | 2064 |
| java.util.Vector | 6394 | 1993 |
| xerces . . . DeferredTextImpl | 960 | 1209 |
| java.util.ArrayList | 215 | 1151 |
| com.bank . . . log.Record | 1 | 1045 |

(b)

| Class Name | Fringe-new |
|---|---|
| java.util.HashMap$Entry | 322 |
| java.lang.String | 243 |
| java.util.HashMap$Entry | 95 |
| com.ibm . . . CredentialsImpl | 20 |
| com.bank . . . MessageModel | 20 |
| byte array | 15 |
| character array | 14 |
| xalan . . . KeyTable | 12 |
| java.util.Hashtable | 11 |

Figure 2A:
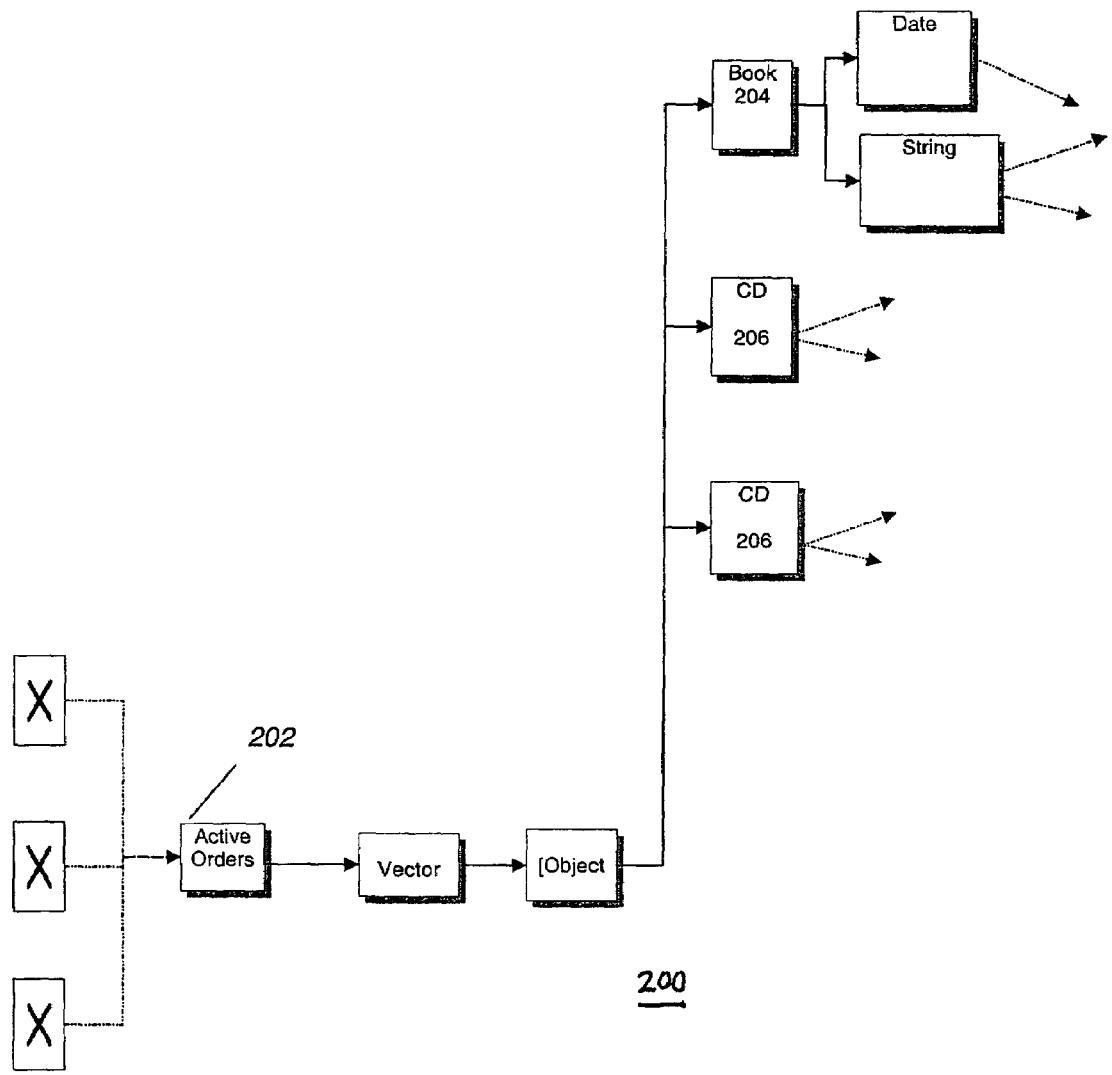
FIG. 2A is a block diagram illustrating a leak root.

Referring to FIG. 2A, there is shown a block diagram 200 of a set of objects illustrating a leak root. A leak root is the object at the head of a data structure which is leaking in one or more ways. Consider an e-Business application with a known leak where each transaction places items into a global ActiveOrders structure 202, but fails to remove some of them when the transaction is complete. The application controls a system for selling CDs and books. In this example, the object Book 204 is removed properly, but the CDs 206 are inadvertently left connected. If every transaction leaks a CD 206 object, then ActiveOrders 202 is probably the best leak root: the most indicative, highest level object responsible.

We may distinguish between a data structure that contains a leak, in this example ActiveOrders 202, and the actual leaking substructures, in this case the CD 206 objects and everything to which they point. In general, a single data structure may contain more than one different type of leak, in addition to regions that are stable or are in flux but not growing.

Figure 2B:
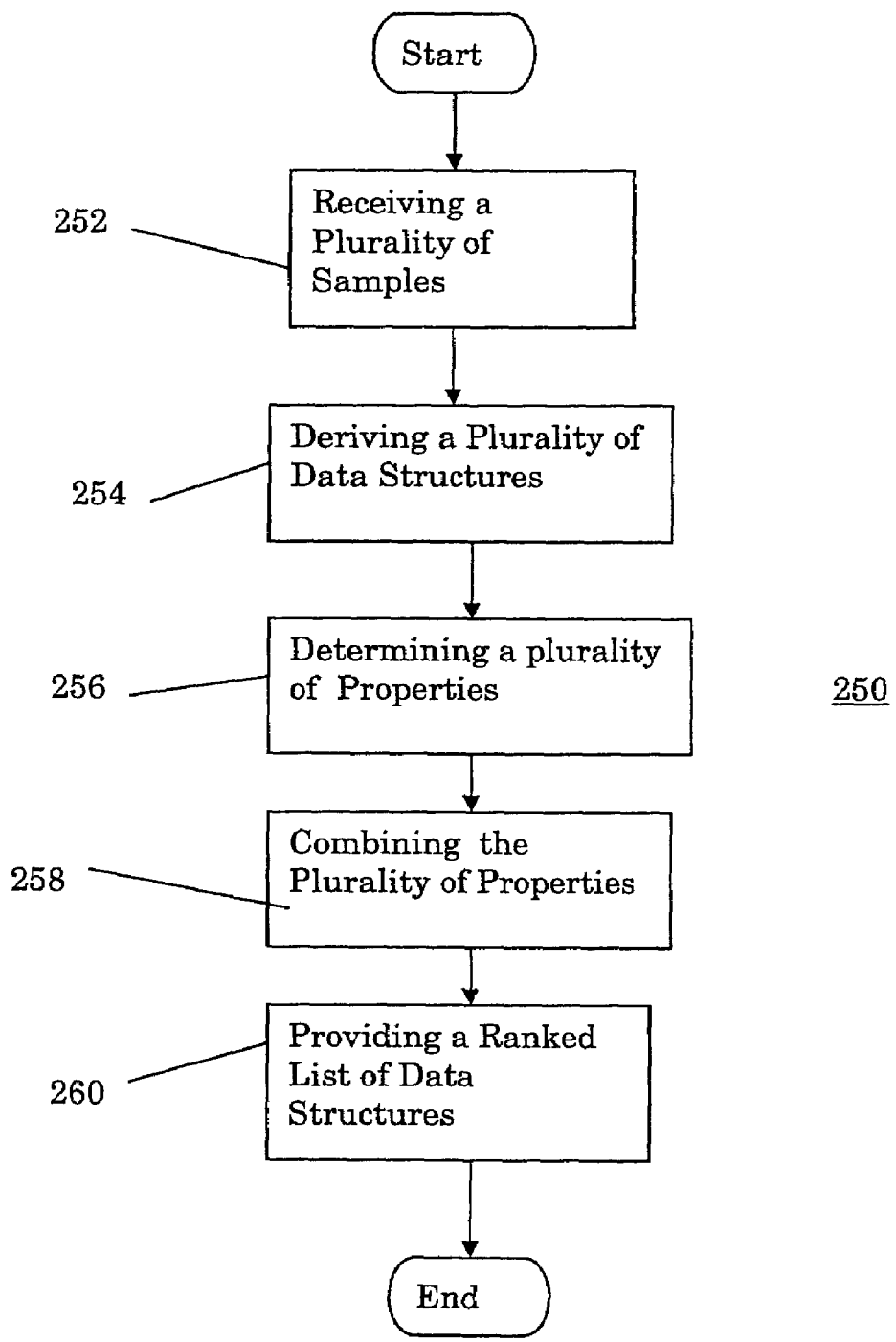
FIG. 2B is a flow chart illustrating a high level view of a method according to an embodiment of the invention.

The method illustrated in FIG. 2B is useful for understanding the overall evolution of a program's memory, such as for diagnosing memory footprint problems and understanding which portions of memory are used for caches vs. pools and diagnosing memory leaks, but for purposes of illustration we now discuss its application for finding memory leaks. An important step in finding leaks is to identify a few data structures in which leaks are likely to be occurring. First, we utilize the leak root concept, which is the head of a data structure containing regions exhibiting unbounded growth (leaks). Finding candidate leak roots is not straightforward because data structures are complex and their properties do not have a simple linear effect on the importance of that data structure. According to an embodiment of the invention, a method for ranking candidate leak roots combines, in a non-linear fashion, a collection of structural and temporal properties of an object reference graph.

According to an embodiment of the invention, a method for finding leaks first identifies candidate leak roots. We do this by ranking each object based on a mixture of structural and temporal properties of the object reference graph, using a small number of snapshots gathered while the application is running. Each candidate leak root may then be used to identify a data structure containing leaks, and ultimately as one of the attributes describing each leaking region. The performance perturbation of gathering a snapshot depends on the method used to gather it. There are many viable snapshot collection mechanisms. One such method is to acquire an address space dump such as an "SVC dump" on z/OS mainframe systems. These mechanisms are essentially free of any perturbation (either in time slowdowns or in space overhead in the running program's address space). Another method is to use the Java Virtual Machine Profiler Interface (JVMPI). If one uses the HPROF tool to collect snapshots, then the perturbation while collecting the snapshots will be higher, because the snapshot collection occurs while the JVM's garbage collector is disabled.

Referring to FIG. 2B, there is shown flow chart illustrating a method 250 according to the invention. In step 252 a system according to the invention receives a plurality of samples of one or more object reference graphs. Each object reference graph comprises live objects. "Live" objects are objects that are not collectible by the garbage collector (GC). In step 254 the system derives a plurality of data structures from the samples. In step 256 the system determines a plurality of properties of each of the live objects from the data structures. In step 258 the system combines the plurality of the properties of each object, resulting in a ranked list of data structures in step 260.

Referring to FIG. 2C there is shown a list of the metrics applied in each of the three ranking phases. Many of the metrics are based on the reference graph attributes of block 280. Some are computed in advance, others are computed on an as-needed basis. In Phase 1, first the Binary Metrics 275 are applied in order to rule out possible candidates. In Phase 2 gating is performed using the Gating Functions 285. Finally, in Phase 3 Fixpoint Metrics 290 are applied. Each of the metrics and its application are discussed herein.

Figure 3A:
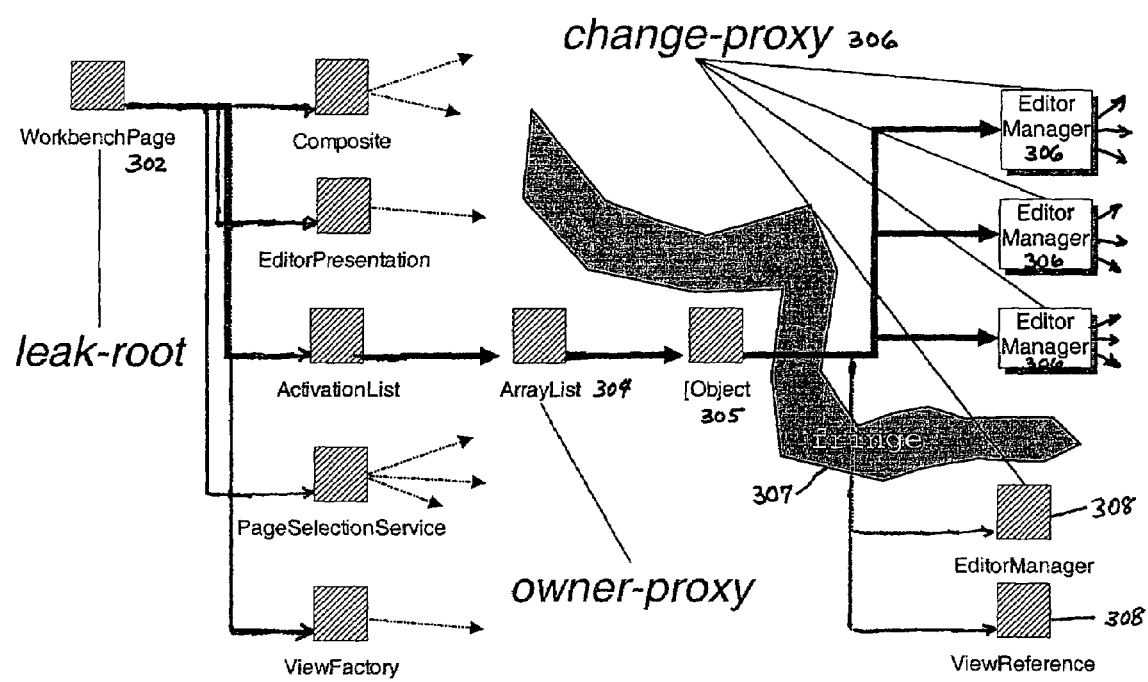
FIGS. 3A and 3B are block diagrams showing the structure of two leaks.

Referring to FIG. 3A, there is shown a block diagram illustrating various objects in a business application. One leak root may encompass multiple regions evolving in different ways (co-evolving regions or CERs). Using the concept of CERs provides a way to identify these distinct regions and concisely model the essence of their evolution. To this purpose, the owner proxy 304 and change proxies 306, waypoints along each member's path from the leak root 302 as used to identify the distinct regions. These waypoints are useful for a number of purposes. First, they classify members into CERs, and allow ranking of regions according to whether they leak. The waypoints are also useful for summarizing the structural highlights and severity of each region's growth for the user.

The two previous phases of identifying leak roots and CERs work by analyzing two snapshots of a reference graph created early in a program's run. A reference graph snapshot is a list of currently live objects, including, for each object, its identifier, data type, and outgoing references. A user could derive substantial benefit from the first two phases and operate in an off-line mode. However, in order to refine the results of the previous phases, it is sometimes necessary to acquire more information as the application runs. However, in practice, creating additional full reference graph snapshots either often or late into an application's run, is far too expensive on large scale applications.

The process of identifying changing structures can be improved by acquiring additional information selectively, using the results of the previous phases. In this on-line mode, we can be selective in two ways. First, we need only monitor the few most highly ranked regions. Second, we need only track a small subset of an entire region in order to determine how the entire region evolves. Referring again to FIG. 3A, we discuss how to use the owner proxy 304 and change proxy 306 to derive a short path that a system according to the invention can periodically traverse to detect how a region evolves. The number of hops in this traversal is very small in relation to the size of large leaking data structures.

A system according to an embodiment of the invention uses the findings of prior phases to refine the analyses and user presentation. For example, the system characterizes each CER according to its actual evolution, and tells the user which containers are growing (i.e. are likely to be sources of leaks), which are alternating in size (e.g. a cache with a flux of constituent objects, or a database connection pool), and which have reached a plateau (e.g. a data structure fully initialized at application startup time). It uses the characterization trend to update the rankings, and also presents this information to the user to assist in understanding the dynamic behavior of each region. Finally, updated rankings allow a system according to the invention to adaptively adjust the frequency with which it explores each region.

An Overview of Leak Root Ranking

Effective ranking of leak roots requires discrimination among leak roots. The discovery process should not propose many more candidates than actual leaks in the program. In addition, it is not enough for the ranking to be merely an ordering; it must be a meaningful ranking as well. If one object is much more likely than another to be a leak root, this should be reflected in those objects' relative ranks.

In addition, the ranking must be independent of the time at which the snapshots were taken. The ranking should perform well with input taken early in a program's run. This allows for quicker turnaround in test environments and it is a practical concern for production settings, where taking snapshots late in a run with a severe memory leak can be prohibitively expensive.

Finally, it is important that the ranking scale to large object reference graphs, both in its memory and time consumption. This is accomplished by filtering many objects down to a small set of candidates in a succession of three phases, each utilizing different criteria. Each ranking phase applies an increasingly resource-consuming (expensive) algorithm to a successively smaller set of candidate leak roots. Each algorithm assigns a number between zero (definitely not a candidate) and one (a highly probable leak root), and each subsequent step only applies to objects ranked above a chosen threshold. The final rank of an object indicates its likelihood of being a leak root. We term this final rank the leakroot rank, or L.

In the example of FIG. 2A above, the illustrated method identifies the ActiveOrders object 202 as a likely leak root. A number of considerations lead to ranking this object higher than other objects in the graph (for example, higher than the Vector 203 object). The ranking algorithms which led to this choice are the realization of the following four observations:

The first observation (Binary Metrics) is that structural and temporal reference graph attributes can definitively rule out many objects, but definitively rule in none. We can easily eliminate some of the objects in FIG. 2A from any further consideration. For example, in Java, array objects do not automatically grow. Therefore, we can rule out the object array. According to an embodiment of the invention eight binary metrics typically reduce the set of candidates from a million to a few hundred objects. These binary metrics are object classifications based on: whether it is a leaf node; whether it is an array; whether it is an internal node; whether it is a non-owner; whether it has no age intersection; whether it is a new array; whether it owns no object on the fringe; and whether there is no intersection in data types between old and new objects developed.

The remaining candidates, however, cannot be assigned a rank of one with absolute assurance. Based on a few heap snapshots, we cannot know that the application will not eventually remove the ActiveOrders Objects from the Vector 203 Oust as e-Business applications eventually clear out cached user sessions). At best, we can say that an object is a good candidate and, with additional evidence, that it is increasingly likely to be so. Also, for the reasons of noise described herein, there are typically many such possibly leaking structures in the reference graph. We prioritize those not immediately ruled out.

The second observation (Mixture Metrics) is that for those objects not ruled out yet, some reference graph attributes are positive indicators, in favor of candidacy, and some are negative indicators. But no one attribute either stands out or always applies. Data structures and leaks have many forms, thus the importance of each attribute varies. Consider the importance of the size of a candidate, treated as a data structure. Increasing size is a positive indicator in favor of candidacy. But it is not always indicative in every leak situation, since not all big data structures leak. For example, consider a business to business gateway application. Typical of many applications, the top five data structures by size are all caches and resource pools. They range from 200 kB to 1.5 MB in size. The known leak root, on the other hand, is (at one point) only 64 kB large. In another typical example, an e-Business form processing application with two leaks, one leak appears as the largest data structure, while the other leak appears only as the 85th largest. The second case was found to be a slow leak.

The third observation (Gating Functions) is that some positive indicators are much more positive than others; and the converse is also true. If the binary metrics prune the candidates down to one hundred, the mixture model must do better than just ordering those hundred by likelihood. We starkly differentiate those that are very likely from those that are less so. We accomplish this differentiation by applying nonlinear gating functions to the values of the reference graph attributes. For example, one criterion that helps rank an object is the number of objects it owns which are referenced by on-stack variables. Owning such objects is a negative indicator, because that implies that this data structure is changing in size only because the heap sample happened to capture some operations in progress. It is desirable that this indicator follow a very sharp curve: owning just a few on-stack roots should highly discount the candidate; owning none should not discount the candidate at all. This is an example of applying a "low pass" gating function to a reference graph attribute.

The fourth observation (Fixpoint Metrics) is that the rank of an object depends on the rank of other objects. There are two main reasons why metrics based solely on reference graph attributes are insufficient. First, when one data structure leaks, all of its enclosing data structures leak as well. However, if the only reason that the enclosing data structures leak is due to that one data structure, then we have falsely identified multiple leak roots for a single leak. However, there are common cases where, looking only at the members and reachability of a candidate leak root, we will be left in this situation (for example, when a candidate has multiple parents).

The second reason stems from the need to combat the noise effects described herein. Consider a leak of the form that objects of type B leak under an object A, and where each B is itself a complex data structure which is populated during (but not after) a transaction. Therefore, if a graph snapshot is acquired concurrently with transactions, then it will appear as if objects of type B are leaking: e.g. in one snapshot they are empty (newly created), and in the second they are fully populated. In this common scenario, object A will appear to leak (because of the true leak of B's into A); but a large number of B's will also be identified, falsely, as candidate leak roots by the attribute-based metrics.

Reference Graph Attributes

The first two ranking phases shown in FIG. 2 use metrics based on a collection of reference graph attributes. While most of these attributes have well-understood meanings, we define them here, for clarity.

SINGLE ENTRY EQUIVALENCE. Given an arbitrary graph G, we compute a reduced graph G' where a node in G' represents all nodes in G in the same single-entry (but not necessarily single exit) region. The edges are collapsed in the obvious way. In the applications we have studied, the collapsed graph has about one eighth as many nodes of the original graph. For example, since many character arrays are each pointed to by a single String object; we can collapse each pair of objects into a single node in G'.

GARBAGE COLLECTION ROOTS. Those objects referenced by sources other than fields of Java objects. Examples of these Garbage Collection (GC) roots include references from local variables currently on the Java or native stack, JNI (Java Native Interface) references from native code, or references from currently held monitors.

REACHABILITY. The reach of an object o is the union of all paths from some set of objects to o. To make this computation efficient, a ranker computes reachability on the single entry collapsed graph. In addition, rather than computing all points' reachability, the ranker only computes a small reachability vector. Each element of the vector counts the number of GC roots of a particular type that reach that single entry subgraph.

UNIQUE OWNERSHIP: One object o dominates o' if any path from a GC root which includes o' also includes o. In the other direction, the objects uniquely owned by an o is the set of all objects dominated only by it; we denote this by $M_o$. Again, so that this analysis scales, the ranker computes dominance on the single entry reduced graph.

AGE: The age of an object is the snapshot in which that object was first witnessed by the system according to the invention. The fringe of an object reference graph is the set of objects in the latest generation immediately pointed to by objects in earlier generations. In this discussion, we say an object is new if it comes from the latest generation, and otherwise it is older.

SIZE: We distinguish between the allocation size and the data structure size of an object. The latter is the total size of its uniquely owned objects.

Ranking Phase I

The Phase I rank of a candidate object is the product of the eight metrics of that object, which are: leaf nodes, arrays, internal nodes, non-owners, no age intersection, new arrays only, no fringe, and no data type intersection. Each metric is computationally easy to determine and each takes on a value of zero or one (for TRUE or FALSE). Thus, if any metric is assigned a value of zero, then that object is definitely not a candidate. A value of one signifies that the object might possibly be a candidate. Otherwise, the binary metrics are considered "agnostic" to that candidate, and it is passed on to the next ranking step. The following binary metrics evaluate to zero for objects with certain structural ($S_1$ through $S_4$) and temporal ($T_1$ through $T_4$) reference graph attributes. We show how, together, these metrics quickly eliminate most objects from further consideration.

Binary Metrics Based on Structural Graph Attributes $S_1$ leaf nodes: these objects cannot possibly be the root of a leaking data structure. Note that a leaf node may eventually point to another object, and commence leaking. But we rely on the fact that it has not leaked yet.

$S_2$ arrays: objects which are arrays. In Java, arrays are allocated with a fixed size, therefore, a leak involving growth of an array must have that array as part of a larger data structure (which reallocates the array when it reaches its maximum size). Therefore, arrays are not leak candidates.

$S_3$ internal nodes: objects which are not the head of a single entry region. From every single entry region, we choose one (the head) as a representative of that region, and disregard the rest. For example, the Vector 203 in FIG. 2A is filtered out using this property since it is a node of ActiveOrders 202. In many cases, this will keep us from identifying more than one leak root for the same leak.

$S_4$ non-owners: objects which uniquely own nothing. An object may be a non-leaf node, but only share ownership of objects with many others. These objects tend to be located close to GC roots, such as class loaders. We ignore them, and instead favor the objects they point to (directly or indirectly) which do own objects. The parents of the ActiveOrders object 202 in FIG. 2A have this property.

Table 3 below shows the cumulative effectiveness (from left to right) of the four binary metrics based on structural graph attributes for five applications.

TABLE 3

| | | Fraction remaining | | | |
|---|---|---|---|---|---|
| | Number of objects | $S_1$ | $S_2$ | $S_3$ | $S_4$ |
| Phone Company | 267,956 | 67% | 59% | 9% | 6% |
| IDE | 350,136 | 61% | 59% | 9% | 7% |
| Brokerage | 838,912 | 65% | 62% | 7% | 3% |
| brokerage2 | 1,015,112 | 71% | 70% | 2% | 1% |
| Finance | 1,320,953 | 60% | 56% | 11% | 8% |

Binary Metrics based on Temporal Graph Attributes $T_1$ no age intersection: the object owns only older, or only new objects. If we have witnessed no objects added to a data structure in any of the reference graph snapshots, then this object is very likely the owner of a pool, or some other unchanging structure. Likewise, if we see no older objects as of the latest graph sample, then we very likely have caught a transient data structure, perhaps due to an in-progress transaction. In either case, we can safely ignore this object.

$T_2$ new arrays only: the object owns only new object arrays, but no new objects inside those arrays. For example, an empty hash table used only during program initialization may still own a large, but empty array.

$T_3$ no fringe: the object owns no objects on the fringe. Some objects may own both new and older objects, but they own none on the fringe. This is likely to be an artifact of shared ownership. To avoid these artifacts, we favor the objects which own both older, new, and fringe objects.

$T_4$ no datatype intersection: the set of data types of older owned objects intersected with the same for new objects is empty. For example, a generic object cache may contain ten strings in one reference graph sample and fifteen integers in a later sample. This data structure passes most of the other binary filters, but nonetheless isn't very likely to be leaking.

Table 3 and Table 4 give five examples of the effectiveness of the binary metrics, for the structural and temporal metrics respectively. These five examples include four large enterprise customers, and one IDE (an internal enterprise application). In each case, the input to the binary metrics was a pair of full reference graph snapshots. The applications had been warmed up various amounts (e.g. with the Finance application the system was warmed up with only five minutes of typical load, whereas for brokerage 2 the system was warmed up with 30 minutes of typical load). Warming up an application entails driving a load mix against the server for the stated amount of time. The load mix can either be artificially applied or can be the actual load of an in-production machine. First the first snapshot was taken, then an additional load was performed (roughly the same as the warm-up load), and lastly the second snapshot was taken.

TABLE 4

| | | | Number remaining | | | |
|---|---|---|---|---|---|---|
| Application | # objects | $S_i$ | $T_1$ | $T_2$ | $T_3$ | $T_4$ |
| Phone company | 267,956 | 16,346 | 73 | 73 | 72 | 29 |
| IDE | 350,136 | 25,653 | 99 | 99 | 29 | 10 |
| Brokerage | 838,912 | 26,291 | 97 | 82 | 81 | 67 |
| Brokerage2 | 1,015,112 | 12,020 | 102 | 102 | 64 | 17 |
| Finance | 1,320,953 | 106,900 | 579 | 519 | 518 | 242 |

The cumulative filtering effectiveness (from left to right) of the four binary metrics based on temporal graph attributes ($T_1, T_2, T_3, T_4$) is shown in Table 4. $S_i$ shows the number of objects left after applying all four structural metrics from Table 3.

On the finance application, the second snapshot has approximately 1.3 million live objects, and the combination of the eight binary metrics filtered out all but 242 objects. This number is somewhat higher than for the other applications because the application was warmed up for a much shorter period of time than for the others. Nonetheless, the binary metrics are effective. As discussed earlier, resilience to input early in a program's run is an important design criterion.

Given input from early in a program's run, the binary metrics typically filter down to several hundred candidates.

A Mixture of Gated Metrics (Ranking Phase 2)

Of the (typically) several hundred candidates remaining after the first phase, not all are equally likely to be interesting candidates. Thus, we rank them by the weighted sum of a collection of gated metrics. As pointed out in the second and third observations above, no one metric is an overwhelming indicator of candidacy, but selected reference graph attributes can be very strong negative indicators. To reflect this observation, we gate each attribute. The particulars of each gating function depend on the attribute, but each has the following characteristics. For extreme values of the attribute, gates are either strongly against or agnostic to that object's candidacy (but never strongly in favor). If an attribute has a strongly negative extreme, the gate assigns a negative rank. By agnostic, we mean that, all other things being equal, we should assign the object a rank of one. In between, the gates use a superposition of cubic exponential gating functions to implement either high pass, low pass, or band pass filters on the attribute's value. We now describe the gates for several of the following attributes.

Gating Functions $G_1$ on-stack ownership: We discount data structures that are growing only because we caught operations in progress based on the number of objects owned that are referenced by on-stack GC roots.

$G_2$ on-stack reachability: We discount those objects reachable from on-stack roots, because the entire data structure may be transient.

$G_3$ ownership counts: Application of the metric $S_4$ has already filtered out objects which own nothing. Here, we favor objects which own both a greater number and size of objects. We consider number and size separately: owning one large array is not as indicative of problems as owning many smaller objects. But comparing two objects which own the same number, we somewhat favor the one of larger data structure size.

$G_4$ new ownership: $T_1$ has already filtered out objects which own no new objects. Here, we favor objects which own a greater number of newer objects.

$G_5$ array ownership: The larger the number of object arrays compared to objects, the less likely the candidate. Also, if a data structure contains no object arrays, it is less likely (though not entirely unlikely) to be a root of leaks. Therefore, for this criterion, the number of object arrays in a data structure, we must apply a band pass gating function to array ownership: not too large a fraction of object arrays, and not too small.

$G_6$ fringe ownership: If an object owns many objects on the fringe, that is a sign that the leak is progressing quickly. All other things being equal, we favor these candidates over others.

$G_7$ fringe datatype uniformity: Single leaks tend to have a fairly uniform datatype on the fringe. If there is only a plurality of datatypes on the fringe, this is an indication either that this data structure may have multiple leaks, or that it is a general purpose data structure with a constantly changing constituency (like a cache). In the former case, we favor the smaller data structures which contain the individual leaks (if not heavily discounted by other metrics). The latter case is ignored entirely.

$G_8$ datatype intersection: As explained earlier, we strongly discount objects without high overlap in owned data types from one sample to the next.

$G_9$ dominance frontier: Data structures that are highly embedded in larger ones tend not to leak. Rather, leaking data structures extend ownership all the way down to graph leaf nodes. Therefore, we discount an object which owns many objects with a non-empty dominance frontier.

Iterative Fixpoint Ranking (Ranking Phase 3)

Finally, a system according to the invention updates the phase 2 rank to account for the interactions identified in the fourth observation. We account for interactions using an iterative algorithm that inflates or discounts the rank of one object based on its rank relative to the rank of related candidates. The method starts with all objects whose rank, so far, lies above a specified threshold. It then iterates until no candidate's rank changes appreciably. In nearly every case, no more than three iterations should be required.

Initially, the phase 3 rank of every object equals its phase 2 rank. At each iteration, we choose a candidate o, and compute the three metrics from o. The metrics are:

$F_1$ immediate domination residue: the sum of the phase 3 ranks of each object o immediately dominates.

$F_2$ by type immediate domination residue: as $F_1$, but add the maximum by datatype.

$F_3$ immediate dominator residue: the maximum of the phase 3 ranks for every object in immediate dominators from, but not including, o.

Let $r_o$ be the current phase 3 rank of o. Update $r_0$ as follows. If $F_1 \approx 0$, then no sub structures are better candidates than the current object; continue to the next iteration with no changes. If $F_1 \approx r_o$, then o is a candidate mainly because exactly one of its sub structures is a good candidate; discount $r_o$ by 50%. Otherwise (if $F_1 > r_o$) multiple of o's sub structures contribute to o's candidacy; if $F_2 = F_1$ then there are two independent problems in sub structures, and so discount $r_o$ by 50%; otherwise, we are witnessing the falsely identified leaks described in the fourth observation, and so discount each of the falsely identified candidates by 50%. We perform similar updates based on $F_3$. If $F_3 = 0$, then no larger structure is a good candidate, so continue with no changes. If $F_3 >> 0$ then there is an enclosing data structure which is a much better candidate than o; discount $r_o$, by 50%.

Examples of the Ranker in Use

The system according to the invention can be used in off-line mode for a variety of applications, including both large GUI (Graphical User Interface) applications and e-Business applications. It can be used for a number of purposes: to diagnose known leaks, to check whether an application has leaks before shipping it, and to verify that fixes for known leaks do in fact work. Three examples are provided here. In each of these examples, the input to the system according to the invention is a trace containing two snapshots of the heap, with a number of suspected leaking operations separating the two snapshots.

Discovering and diagnosing a leak. In a first example, there is analyzed a large GUI integrated development environment, heavily dependent on frameworks, for leaks. Opening and closing an editor window were tested. Three operations are performed: the IDE is "warmed up" with two operations; a heap snapshot, then one more operation, and finally a second heap snapshot. Table 5(a) shows that, from 350 thousand live objects, the ranker chooses only three with non zero leakroot, and only one with leakroot above 0.5.

Tables 5(a)-5(f) show examples of a leak root ranking, showing the objects with highest rank (L), with those at the head of actual leaks annotated (*).

heap, the structural and metric computations take 15 seconds each (on a 1.2 GHz Pentium3 M). The same analysis applied to the fixed code appears in Table 5(f). This time, the ranker assigns nine objects a non-zero leak root, and it assigns no objects a leak root greater than 0.3.

TABLE 6

| rank | Percent | | Live | | Allocated | | Stack Trace | Class Name |
| | self | accum | bytes | objs | bytes | objs | | |
|---|---|---|---|---|---|---|---|---|
| 1 | 5.27 | 5.27 | 639600 | 39 | 2279600 | 139 | 1522 | character array |
| 2 | 4.57 | 9.84 | 554488 | 7339 | 559752 | 7540 | 2262 | character array |
| 3 | 4.35 | 14.20 | 528192 | 6762 | 589504 | 7294 | 1530 | character array |
| ... | ... | ... | ... | ... | ... | ... | ... | ... |
| 640 | 0.01 | 85.45 | 1152 | 18 | 1152. | 18 | 19766 | EditorManager$Editor |

Table 6 shows a subset of the output of HPROF on the IDE application from Table 5A. The head of the structures which are leaking is ranked 640th.

Co-Evolving Regions: Patterns within Leaking Structures

We have identified leaks by finding candidate leak roots, objects which head data structures that possibly contain leaks. However, there are several reasons why this information is too coarse. For example, one leak root may identify more than one leak. In addition, leakage is not the only way a data structure can change. There is a variety of ways in which evolution happens. For example, one data structure can have distinct regions that evolve as leaks (grow without bound), as caches or pools (bounded size, changing constituency), that may never change (e.g. a preloaded data structure), that may shrink (e.g., if used only for initialization), or that may switch between these various types of evolution. We now refine the method from the level of a data structure to the level of regions within that structure. The objective is to identify regions that are as big as possible, but that still evolve in a single, coherent way.

Coherency of evolution is determined by several factors. First, the region should exhibit only one type of evolution: monotonic growth, monotonic shrinkage, bounded changing constituency, or bounded fixed constituency. These terms are also known as "grower," "shrinker," "flatliner," and "oscillator," respectively. These four terms are indicators of how a region's constituency changes over time. A region with monotonic growth will have a constituency which increases in size (as a set, so that new elements are constantly added). A region with monotonic shrinkage does the opposite. A region with bounded-fixed constituency will, over time, always maintain some bounded constituency size, and furthermore, the specific constituents at any point in time come from an unchanging set. This means that at any time the region will contain no more than five elements and the elements will be one of $\{A, B, C, D, E, F, G\}$. A region with bounded-changing constituency similarly has a bounded size, but the specific constituents at any point in time will come from an unbounded set. This means that the region will never be larger than five elements in size, and the elements at any point in time are of the set $\{A, B, C, D, E, F, G, H, I, J, \ldots\}$.

Second, as a region evolves, different ones of its elements are, or once were, on the fringe. Those fringe elements are

| class name | L |
|---|---|
| (a) IDE | |
| (*)WorkbenchPage | 0.719 |
| WidgetTable | 0.446 |
| ResourceBundle | 0.31 |
| (b) IDE bug fixed | |
| WidgetTable | 0.430 |
| Delt8DataTree (#1) | 0.322 |
| Delt8DataTree (#2) | 0.320 |
| (c) auction no leak | |
| DDRMain | 0.396 |
| ibm.LogUtil | 0.265 |
| (d) brokerage fixed | |
| APCache | 0.830 |
| TemplateCache | 0.805 |
| AntiVirus | 0.757 |
| Record | 0.596 |
| (*)XSLTransform | 0.582 |
| (e) brokerage2 | |
| (*)EventNotifier | 0.848 |
| ibm.CachedTargets | 0.579 |
| (*)FormProperties | 0.572 |
| (f) brokerage2 bug | |
| ibm.CachedTargets | 0.271 |
| ibm.ORB | 10.234 |

Verifying that a Fix to a known Leak Works

Our third demonstration is from a leaking e-Business form processing application. The developers had already implemented fixes to two leaks, but wanted two types of assurance: first, that the patches indeed fixed the problem, and second, that there were no remaining leaks. The customer could not afford to discover, after deploying the fixes and running in production for several days, that there were still leaks. We first apply a ranking method using an aspect of the invention's ranker to the server running a known leaking version of the code. Table 5(e) shows the result: from one million live objects, the ranker finds ten with non-zero leak root, five with leak root above 0.3, and only three above 0.5. With a 300 MB similar to each other. Third, all members of a region must share a similar relationship to the region's leak root.

We now discuss a method for finding likely CERs. To find CERs, we develop an equivalence relation for objects owned by a leak root. To every object owned by a candidate leak root we assign a Region Key, a tuple of features reflecting the important components of equivalence. We define similarity of Region Keys, and classify a leak root's members based on Region Key similarity. Finally, we describe how to prioritize the CERs using a simple ranking algorithm.

Region Keys

Figure 3B:
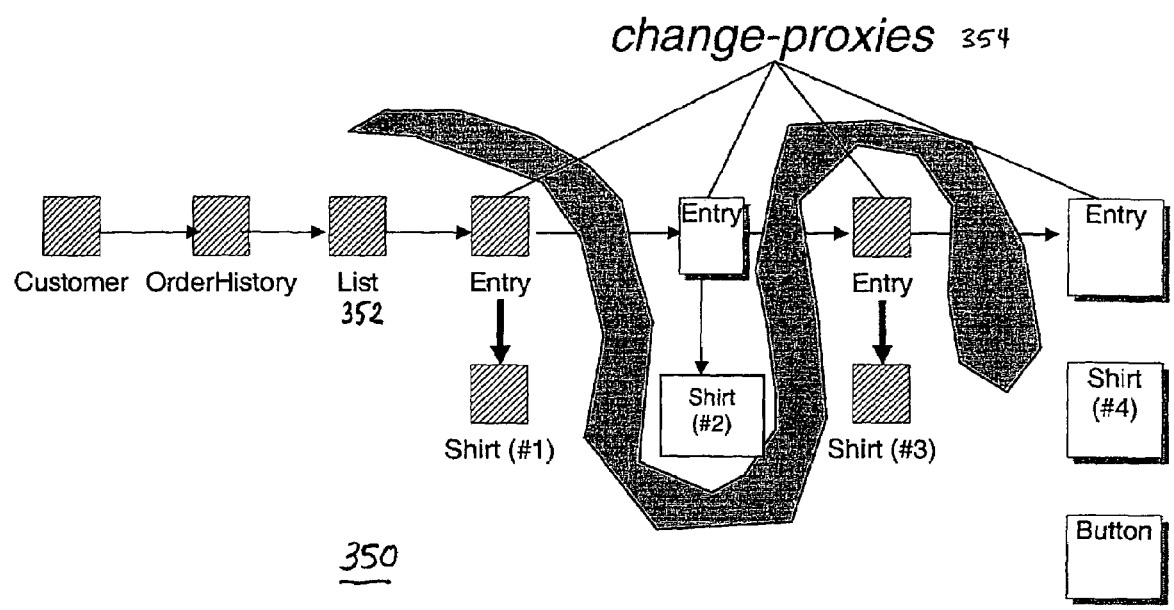

Referring to FIGS. 3A and 3B, there are shown the structures of two leaks. The leak path does not solely indicate co-evolution. The elided path of leak root, owner proxy 304, and change proxy 306 is a better indicator.

Referring again to FIG. 3A, there is shown a leak occurring via an array (it is on a path to objects that are leaking). The leak root is the Workbench Page 302. The object Array List 304 is an owner-proxy and the Editor Manager objects 306 are change-proxies. A fringe 307 divides the old objects from the new ones, the Editor Manager blocks 306. Two members are part of the same CER based in part on their paths from their leak roots. As there may be many such paths, we identify one.

The leak path, $P_m$, of m owned by leak root o is the reverse of the path of immediate dominators from the m to o. The entire leak path is too rigid a specification to be useful for classifying objects into regions. In the array example, both the EditorManager objects 306 and all their constituents should be part of the same CER, and yet their paths are, in large part, different.

Referring to FIG. 3B, there is shown a block diagram 350 of an example of a leak occurring via a linked list. Consider an application for sales of shirts. In this example, even the leak paths of only the highest level leaking objects (the Entries) can be very different. And yet, in both examples, members of one region have somewhat similar leak paths. While the leak path in its entirety does not indicate co-evolution, there is an elided version, which does. We identify important "waypoints" in every leak path that indicate similarity of evolution. Every object between the waypoints is effectively a wildcard for determining in which region a member belongs. The only parts of the path which do matter are the leak root, and two concepts we now utilize: the owner proxy, and the change proxy.

Referring again to FIG. 3A, the owner proxy 304 is a stable object on the old 20 side of, and in close proximity to, the fringe 307. The change proxy is that indicator of updates to the region; for this, we choose the largest stable object on the new side of the fringe.

In another example, FIG. 4 shows the leak paths for several of the objects in FIG. 3B. It illustrates how the waypoints define wildcard subpaths of each leak path. The change proxy for the Shirt and Button objects is the same, because every leak to that region is indicated by the addition in a similar way. The Region Keys for the Shirts and Buttons are the same, so they are part of one CER.

The distance-from-fringe of an object o on a leak-path $P_m$ is the number of hops from "o" to an object on the other side of the fringe. It is positive for objects on the old side of the fringe, and negative for those on the new side. We denote this by $d_{o,m}$. Also let $c_{o,m}$ be the number of fringe crossings along $P_m$ from m to o. Finally let $t_o$ be the expected lifetime of object o.

For example, referring again to FIG. 3A along the leak-paths from the Workbench Page 302 to the Activation List 303, Array List 304, [Object to the Editor Manager 306, the [Object 305 has a distance of 1, and the EditorManager objects 306 each have distance of −1. When computing the Region Key for a member m, we have found that a simple model of expected lifetime works very well in practice. Assume that arrays and objects with the same data type as the chosen change proxy have an expected lifetime of 0, that new objects have 1, and that old objects have 10.

The change-proxy of a new member m, $C_m$ is that object o in $P_m$ that maximizes $-t_o/d_{o,m}/(1+c_{o,m})$. The owner-proxy, $O_m$, maximizes $t_o/d_{o,m}$. Consider finding the owner-proxy and change-proxy for the Shirt object in the linked list example shown in FIG. 3B. In determining the change-proxy 306, the ratios specified in the above definition for each element in $P_m$ are (−0.833, 1.25, −2.5, +0.333, −5, +1, +0.5), indicating the best choice of change-proxy is the right-most Entry object. For the owner-proxy 304, the ratios specified in the above definition for each element in $P_m$ are (+3.33, +5, 0, 0, 0, 0, −0.125) indicating the best choice of owner proxy is the List object. A similar process for the leak in FIG. 3A will determine that the ArrayList 304 is the owner-proxy of every EditorManager object 306: the Object array is closer to the fringe, but has a much shorter expected lifetime, and the objects further upstream have equal lifetimes but larger distances.

The Region Key of an object m belonging to leak root L is the tuple $(L, O_m, C_m)$. The Region Key for m and m' are equal (i.e. objects m and m' belong to the same CER) if L=L', $O_m = O_{m'}$, and the datatype of $C_m$ is the datatype of $C_{m'}$. More generally, either $C_m$ is assignable to the datatype of $C_{m'}$ or vice versa.

Using Region Keys to Find CERs

For every leak root candidate L whose rank lies above a desired threshhold, CERs are computed as follows. To L we associate a set of regions. To each region, we associate two numbers to measure a region: the total number of bytes which belong to that region, and the number of distinct data structures within that region. The latter is a useful metric, because it estimates the number of leaking operations which led to that region's current constituency. Then, for each m that is an element of $M_L$ whose $P_m$ spans the fringe (i.e., $c_{L,m}>0$), we do the following. Compute m's Region Key as described above, and insert it into L's region set. If an equivalent Region Key already exists, increment that region's dump-size. If an equivalent Region Key with the same change-proxy exists, increment that region's proxy-size.

The dump-size of a region is the number of Region Keys that map to that region. The proxy-size of a region is the number of distinct change-proxy objects over all Region Keys which map to that region.

For example, using this process, in the IDE application discussed above, the highest-ranked candidate leak root (the WorkbenchPage 302 object of FIG. 3A) has two regions. The proxy-size of the known leaking region is precisely the number of leaking operations that had been performed: three suspected leaking operations.

Ranking Regions

Finally, as noted above, not all regions are equally likely to leak, so we rank them. When comparing one region to another, we consider three criteria. First, if one region's leak root has been ranked higher than another, this ranking influences the relative ranking of the regions similarly. Second, if one region has a higher proxy-size than another, we favor the larger one. We do not use dump-size, because it is preferable to rank based on an estimate of the number of leaking operations which have been performed, rather than the byte size of the leak. Finally, if one region's proxy size is growing faster than another's, we favor the faster-growing one. This third criterion allows for updating the region ranks as we gather more information from the running application. A region's rank is the unweighted average of the above-discussed three elements. Unlike the leak root ranking described where a root's rank was bounded at one, we now allow a region's rank to grow without bound. This allows for differentiating regions based on their leak rate, whereas bounding at one would asymptote all leaking regions to the same rank. An additional benefit of having found regions that are likely to co-evolve is that the system according to the invention can present a high level schematic of the suspected problematic regions of the reference graph.

Inexpensive, Adaptive, Online Tracking of Regions

We have described the analyses of the methods discussed above assuming an off-line usage scenario: acquire snapshots, find candidate leak roots, and then find CERs within highly ranked candidates. The method could stop at this point. However, it is desirable to know more than just the structure of problematic regions. It is also useful to know how those regions actually evolve.

In off-line mode, our estimates of actual evolution are limited by the information in initial snapshots. An objective is to acquire initial snapshots as early into the run as possible. Continuing to use the method of FIG. 2, the ranker remains connected to the program under analysis, it can present a more refined view of how regions continue to evolve.

A principal constraint of the system discussed above is that it must minimally perturb the analyzed program's behavior. Region Keys, in addition to helping us find CERs, can also help us derive lightweight probes to discover how these regions actually evolve. Using this region information, a system according to the invention periodically traverses selected subgraphs of the object reference graph of the running application being analyzed. It reports important structural changes back to the analyses of the previous sections. With the updated analysis (closing the feedback loop), we update the traversals as described below.

For example, to efficiently detect leaks of data structures into an array, it is not necessary to keep track of every element in those leaking data structures. Instead, it is sufficient to periodically examine the references from the array, to a depth of one. There is no need to look any deeper into each leaking data structure, since we can just count the array contents by datatype. However, there is another case we must consider. In Java, an array is of bounded size. Thus, if the CER has monotonic growth, we would expect occasional reallocations of the array; when adding to an ArrayList, the underlying array is a transient object. Therefore, we must start the traversal from ArrayList, not the array. Observe that the same traversal also detects elements having been removed from the array. In addition, it can be used to inform us when a relinking has occurred—that is, when one path element has been replaced by a new one. Observe that this traversal (in this case) follows precisely the path between owner-proxy and change-proxy.

This example shows that, to know how a CER evolves, we must derive a set of traversals that detect certain updates: additions, removals, and relinking. In some cases, one traversal can detect more than one of these updates. If, when doing the actual traversal, we witness an evolution, we say that an update has been detected.

For every region, we keep a histogram of detected updates. We use this to estimate a region's evolution trend. For example, if only addition updates have been detected for a region, we say that region is a monotonic grower. If a roughly equal mixture of addition and removal updates has been detected, we classify the region as an "oscillator," or "alternator." If only removal updates have been detected, it is a "shrinker." If no updates are detected, then it is a "flatliner."

FIG. 5 shows a screenshot (in the form of a table) of a portion of the output of a leak detection tool according to the invention. The table has one row per CER, and indicates for each its current proxy-size and evolution trend. Each row corresponds to one suspect region. For each region, we show its region rank ("rank of leak"), the proxy-size ("# leakages"), and a summary of the trend and tick of that region's evolution. Tick and trend are attributes which show the last change noted and, over some rolling window, what the last n changes were. Both attributes categorize a region's evolution into, for example, one of grower, shrinker, alternator or flatliner. These four categories reflect regions which have been observed to monotonically grow, monotonically shrink, to alternately grow and shrink, and to have achieved a plateau in size, respectively.

Note that, in some cases, such as shown in FIG. 3B, traversal could be much longer than necessary: as the list in that example grows, so does the traversal. The solution to this problem of finding efficient traversals involves defining a family of short traversals, which explore the fringe as it evolves.

Tracing Adaptively

Figure 7:
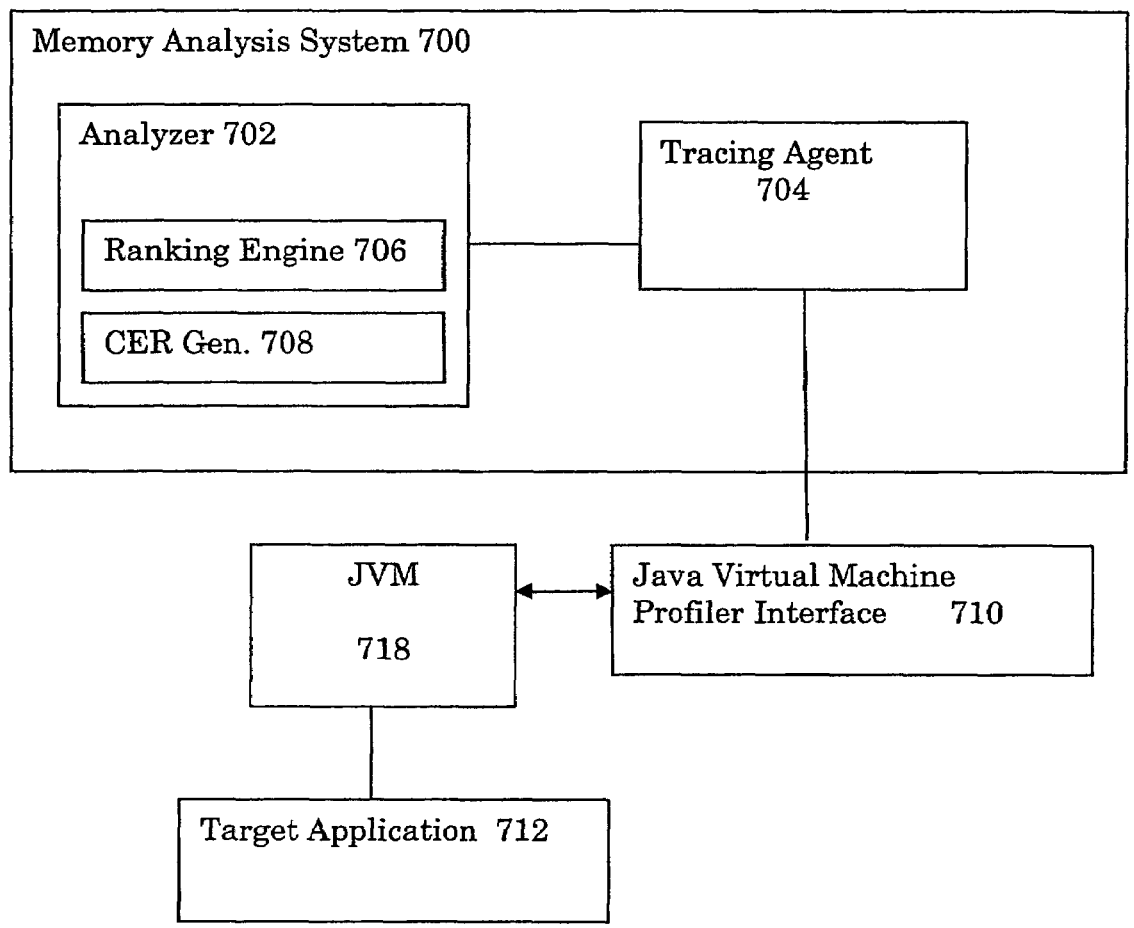
FIG. 7 is a block diagram of an information processing system according to an embodiment of the invention.

Referring to FIG. 7, there is shown a simplified block diagram of a memory analysis system according to an embodiment of the invention. The adapter tracing begins with the processes of the first two phases. The analyzer 702 then publishes the traversals to the tracing agent 704. The tracing agent 704 spawns a thread that cycles through the unique traversals and periodically (e.g., once per second) performs at most one traversal every time it wakes up. Each traversal samples the reference graph of the running application. The agent 704 assigns, to each unique traversal, a sample bias which lies between 0 and 1, and is initially 1. The bias is the probability that, when a traversal's turn comes up, the agent 704 will actually perform the traversal. For every traversal, the agent 704 determines whether any of that traversal's associated updates have been detected. It reports the result of a sample (i.e. as an element having been added, removed, or relinked or that none of these has occurred) back to the analyzer 702. For example, when an addition update is detected, the analyzer 702 updates the proxy-size of that region; it can also use this information to update the rank of a region.

The system 700 according to the invention adaptively adjusts the sample bias of the traversals. Since we are interested in tracking leaks, we increase the bias whenever an addition template fires, decrease it whenever no template fires, and decrease it even more so when a removal template fires. The system 700 ensures that no CER is completely ignored, in case the CER's mode changes at some point.

Implementation of the Tracing Agent

The system 700 according to the invention works with either full reference graph snapshots acquired earlier, or selectively acquires this information via a live connection.

The analyzer 702 can parse previously acquired trace files in the Sun Microsystems heapdump format, the IBM heapdump format, or the Jinsight format. The agent 704 relies on the Java Virtual Machine Profiling Interface (JVMPI) 710 to gather information from the JVM 718.

The JVMPI 710 identifies objects by their memory address. Therefore, to maintain unique object identifiers over the course of the analysis, the agent 704 needs to listen to object move and free events. This slows down garbage collection by as much as a factor of two. Luckily, the system 700 allows this interval to be very short. Once we have identified CERs, we no longer listen to move and free events. Instead, we use weak references to maintain persistent identifiers just for the elements of traversal paths—a very small number of weak references in relation to the entire reference graph. Therefore, once tracing begins, we do not measurably perturb the garbage collection. In addition, because the sampling process itself is so infrequent and selective, the cost of the sampling is also very small. In fact, the only measurable slowdown is the cost of having a agent 704 attached, not of listening to events. For example, when attached, some JVMs use a slower object allocator. This overhead can run as high as several percent, which still meets our design constraint.

Figure 6:
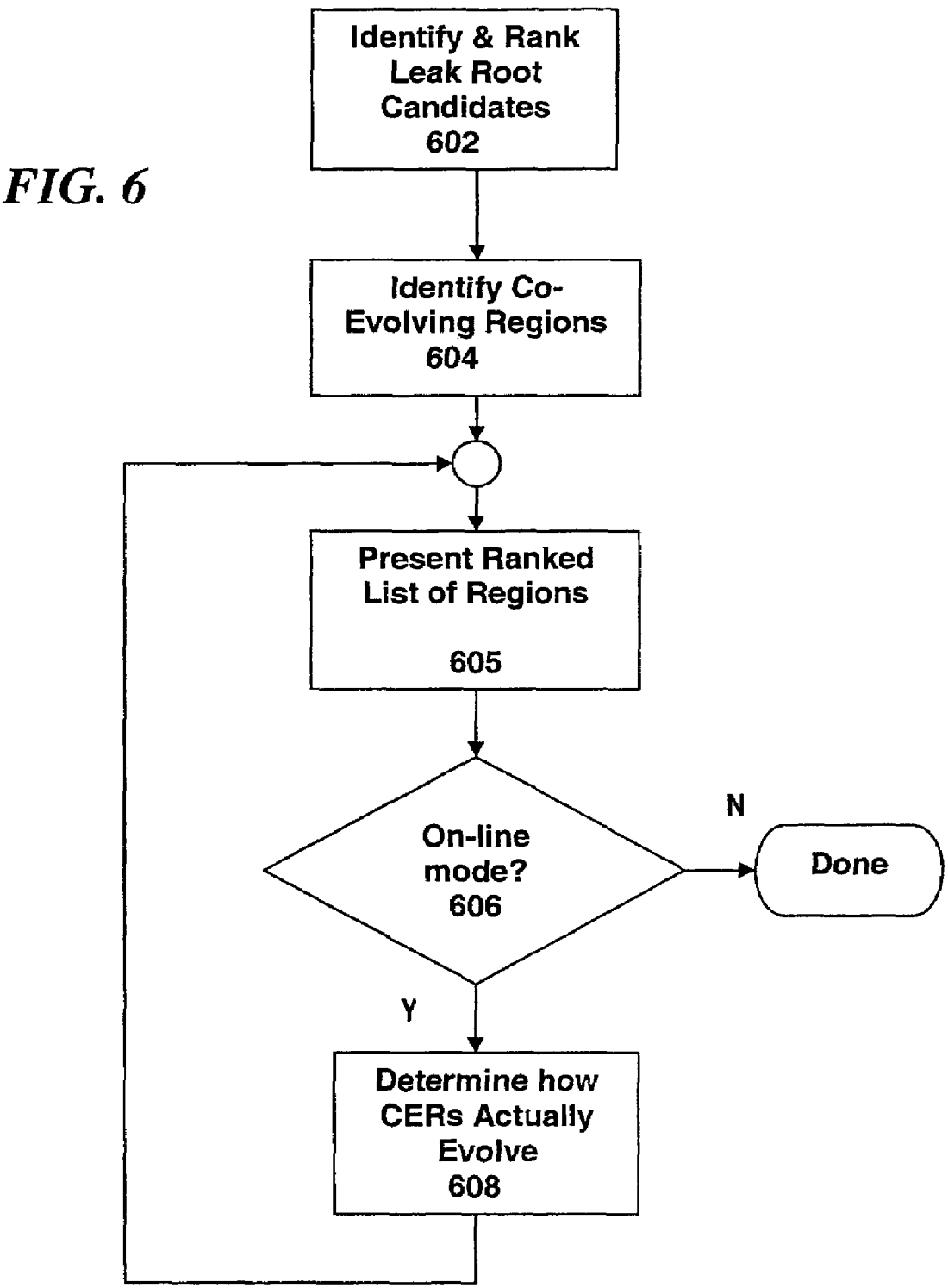
FIG. 6 illustrates a method according to an embodiment of the invention.

Referring to FIG. 6, a method, according to an embodiment of the invention, for identifying a set of objects that are possible root causes for leaks operates on one or more samples First in step 602 the method identifies and ranks leak root candidates. Second, in step 604 the method identifies CERs. Step 605 will determine if the system is in on-line mode. If the answer is No, then in step 608 a ranked list of data structures is presented. After that, in step 606 the method determines how CERs actually evolve. Step 606 can also be reached directly from decision 605 if the system is in on-line mode. In that case, step 608 is bypassed.

Therefore, while there have been described what are presently considered to be the preferred embodiments, it will be understood by those skilled in the art that other modifications can be made within the spirit of the invention.

We claim:

1. A method comprising:
   a) receiving a plurality of samples of at least one object reference graph, wherein each object reference graph comprises live objects from a target application program, and their references;
   b) deriving a set of candidate data structures exhibiting a problematic data structure evolution, from the samples;
   c) collecting a plurality of properties of each of the live objects in each of the candidate data structures in relation to data structures over time; and
   d) using a mixture model, combining the plurality of properties of each live object in a non-linear manner for ranking leak root candidates within each set of candidate data structures;
   wherein using the mixture model comprises:
   applying binary metrics to each of the candidate data structures for generating a set of potential leak root candidates, wherein leak roots comprise root objects of a leaking data structure, and wherein the binary metrics comprise attributes of: leaf nodes, arrays, internal nodes, non-owners, no age intersection, new arrays only, no fringe, and no data type intersection;
   assigning a binary metric value to each candidate, wherein a value of zero indicates the candidate data structure is definitely not a leak root candidate and wherein a value of one indicates said candidate data structure is a highly probable leak root candidate; and
   filtering out candidate data structures with any binary metric assigned a value of zero.

2. The method of claim 1 further comprising generating the at least one object reference graph.

3. The method of claim 1, further comprising e) generating the ranking.

4. The method of claim 3, further comprising identifying an initial set of highly-ranked candidate objects that are possible causes of at least one problematic data structure evolution, wherein the higher the ranking the smaller the identified set.

5. method of claim 1 further comprising identifying a region leak root by identifying suspicious regions that are likely to have leaks within the data structure.

6. The method of claim 5 further comprising using the mixture model for determining an expected evolution of the suspicious regions.

7. The method of claim 5 further comprising tracking the actual evolution of the suspicious regions as the target application program runs.

8. The method of claim 1 wherein d) further comprises combining structural and temporal properties of the object reference graph.

9. The method of claim 1 wherein receiving the plurality of samples comprises gathering object reference graph snapshots during a run of the target application program, wherein the object reference graph snapshot comprises a list of currently live objects and each currently live object's identifier, data type, and outgoing references.

10. The method of claim 1 further comprising ordering each candidate in the set of potential leak root candidates, the ordering comprising:
    determining a gated metric threshold value;
    applying a weighted sum of a collection of gated metrics comprising gating functions of: on-stack ownership, on-stack reachability, ownership counts, new ownership, array ownership, fringe ownership, fringe datatype uniformity, datatype intersection, and dominance factor;
    filtering out those candidates with gated metrics below the gated metric threshold value; and
    assigning rank values to remaining candidates according to the gated metrics.

11. The method of claim 10 further comprising:
    determining a fixpoint metric threshold rank for each live object of each ordered potential leak root candidate;
    deriving a set of live objects that exceed the fixpoint metric threshold; and
    applying an iterative algorithm to the derived set of live objects, wherein the iterative algorithm changes the rank value of one object based on its rank relative to the rank value of related candidates.

* * * * *